UNITED STATES PATENT OFFICE 2,364,192

SYNTHETIC PHENOLIC RESINS

William Charlton, Jack Blatchley Harrison, and Roy Basil Waters, Blackley, Manchester, England, assignors to Imperial Chemical Industries Limited, a corporation of Great Britain No Drawing. Application February 18, 1942, Serial No. 431,442. In Great Britain February 20, 1941

8 Claims. (Cl. 260—53)

This invention relates to the manufacture of synthetic resins and more particularly to the manufacture of phenolic resins suitable to be cooked into drying oils to make air-drying and stoving varnishes.

It is desirable that a resin to be used in making oil varnishes should blend readily on heating with large or small proportions of drying oils with little or no frothing; that the resin-oil system should not body so rapidly during the blending that there is danger of premature gelation; that the varnish so made should dry rapidly and yet should be stable during storage; and that films laid down therefrom should have good initial colour and colour retention, good resistance to water, acids and alkalies and good durability on outdoor exposure.

Although numerous oil-soluble phenolic resins suitable in many respects for varnish making have been described, none hitherto has had a thoroughly satisfactory balance of properties. For instance, some phenolic resins are known from which pale coloured varnishes can be made which yield films with good colour retention and good resistance properties, but these froth badly during the blending with the oil and the resin-oil system bodies up so rapidly that short-oil tung oil varnishes cannot be made therefrom. Moreover, these varnishes give films with only moderate durability to outdoor exposure. Other oil-soluble phenolic resins are known which produce little or no frothing during the blending with the oil, forming systems which body only slowly, so that long, medium or short oil varnishes can be made satisfactorily therefrom. Moreover, the varnishes so made have good durability on outdoor exposure. On the other hand they usually dry slowly, have poor storage stability and give films with poor colour-retention.

We have now found that satisfactory phenolic varnish resins, which can be blended readily with drying oils, with little or no frothing and with very little risk of premature gelation, in the proportions needed for long, medium or short oil systems, to give pale coloured varnishes, stable on storage, from which films are laid down which dry rapidly, have good colour retention and good resistance to water, acids and alkalies, can be made by combining dialcohols of particular phenols, or the resoles obtainable therefrom, with aliphatic aldehydes of 3 to 8 carbon atoms.

Thus according to the present invention improved phenolic varnish resins are made by a process which comprises heating a methylol derivative (as hereinafter defined) of a p-alkyl-substituted monohydric phenol with an aliphatic aldehyde of 3 to 8 carbon atoms at a moderate temperature, e. g. 70°–160° C., in the presence of an acidic catalyst and, if desired, in presence also of an inert organic liquid acting as a solvent for the reagents, until no more water is evolved and then removing the solvent and heating the residue to a higher temperature, e. g., 160°–190° C., to harden the resin.

It is preferable, where a lower aldehyde is used, to harden off the resin until it has a melting point (as measured by Durrans' method) of at least 70° C. Softer resins frequently tend to agglomerate on storage. Moreover, resins not so hardened give varnishes which yield films having rather poorer resistance. If a higher aldehyde is used, for example heptaldehyde, the resin remains soft and semi-solid, even after prolonged heating. Nevertheless, it is a good varnish resin although it is not so convenient to handle and store as those made from the lower aldehydes and varnish films made therefrom have not quite as good resistance as those made from butyraldehyde.

If, on the other hand, the resin is not to be transported or stored, but is to be made forthwith into an oil varnish, then the final heating time may be cut down or the final heating step may be omitted altogether. In this case it is only necessary, when the condensation of the methylol derivative with the aldehyde has been completed, to remove any uncombined aldehyde or other solvent and then to blend the residual resinous condensation product in the usual way with the drying oil. As already explained, varnishes made in this way give films with rather poorer resistance than do those made from hardened resins. Nevertheless they are useful varnishes for many purposes and possess the other technically valuable properties of the varnishes made from the hardened resins.

The invention therefore comprises also a modified process wherein the initial condensation products formed from the aldehydes and the methylol derivatives are not hardened or are not hardened to such a degree as to be solid when cold, but preferably after removal of any uncombined aldehyde or other solvent, are employed in a viscous liquid or semi-solid plastic condition for the blending with the drying oil.

By the term "methylol derivative" as used in this specification we mean the phenol dialcohols which are obtainable in known manner by condensing the phenols at low temperature with two molecular proportions of formaldehyde in the presence of alkaline condensing agents, and the resoles derived therefrom, that is the fusible, soluble, low-molecular condensation products obtainable by gently heating the phenol dialcohols so that they split off water and a minor proportion of formaldehyde. This use of the term "resole" agrees with that proposed by Hönel in the Journal of the Oil and Colour Chemists Association 1938, vol. 21, p. 248. The resoles are a series of phenol-formaldehyde condensation products all of which contain methylol groupings. The early members of the series are liquids or crystalline solids and are little removed in molecular complexity from the dialcohols. As the heating (and consequent elimination of water and formaldehyde) proceeds, the molecular complexity increases and the later members of the series are solid resins, but since their initial formaldehyde content did not exceed 2 mols. formaldehyde to 1 mol. of phenol, they never attain the insoluble and infusible "resite" stage however much they are heated. The phenol dialcohols are thus to be regarded in many respects as being the first members of the resole series.

It may perhaps be conveniently mentioned here that in our experience resins made by our process from lightly condensed resoles form varnishes with slightly better resistance to water, acids and alkalies than resins made in an otherwise similar manner from the phenol dialcohols. If, however, the resole is condensed too far, so that it has lost most of its reactive methylol groups, then the resistance of the varnishes made therefrom falls off again.

As already indicated, the phenols from which the methylol compounds are to be derived are the monohydric phenols which carry an alkyl group in the p-position. They may be further substituted, for example, by alkyl groups or halogen atoms, provided such substituents are not attached at either of the p-positions. These must be free. Suitable phenols are, for example, p-cresol, p-tertiary butyl phenol and p-octyl phenol.

Mixtures of dialcohols or resoles, or resoles made from mixed phenols, may likewise be used.

As suitable aldehydes there may be mentioned, for example, n-butyraldehyde, iso-butyraldehyde, heptaldehyde and 2-ethylhexenal.

The aldehyde and the dialcohol or resole need not be used in equimolecular proportions. In fact it is often convenient to use considerably more than an equimolecular proportion of aldehyde since the excess then acts as solvent for the reagents and if of suitable boiling point provides a convenient means of controlling the temperature. We have found that in some cases during the heat-hardening stage a portion of the aldehyde which has combined with the methylol derivative during the early part of the reaction is eliminated. In fact, we have found that in some cases the hardened resin finally contains only 0.25 to 0.5 mol. of aldehyde per mol. of phenol dialcohol, even though an excess over the equimolecular proportion was present initially in the reaction mixture and substantially 1 mol. per mol. of phenol dialcohol was combined in the unhardened resin. Alternatively, less than one mol. of aldehyde per mol. of phenol dialcohol may be used.

If the reaction mixture does not contain a sufficient excess of aldehyde to provide a quantity of refluxing liquid adequate to control the temperature of the reaction, it is preferable to add an inert organic liquid which will dissolve the reagents and which has a suitable boiling point. Aromatic hydrocarbons which upon distillation carry off the water of reaction, for example, toluene, are preferred. The mixed vapours are condensed, whereupon the water and toluene separate; the former is rejected and the latter is returned to the reaction vessel.

It may be added here, by way of explanation, that a second, important function of the excess of aldehyde or other solvent is to facilitate the removal of inorganic salts which are inadvertently introduced into the reaction system when, as is frequently the case in technical practice, a crude preparation of the methylol phenol is used as starting material. The methylol phenol itself is soluble in the aldehyde or other, separately added, organic liquid such as toluene, but it is usually made in an aqueous alkaline medium and is precipitated therefrom by addition of acid so that inorganic salts are usually present in the crude preparation. Since the oily methylol phenol is appreciably water-soluble, it is uneconomic to wash it sufficiently to free it completely from these inorganic salts, which therefore pass forward into the resin and, if not removed before the final hardening stage, cause it to be cloudy. Now if no solvent is used it is impossible, at least on a technical scale, to filter out these inorganic salts from the resin solution which remains after the water has been distilled out, because the material is too viscous and also because the salts appear to be held therein in a colloidal state. If, however, an excess of aldehyde or another solvent is used in the resin-forming reaction a fluid filtrable product is obtained from which filtration removes the salts, so that clear, bright resins can be obtained. This filtration is conveniently carried out immediately after the removal of the water from the system and before the residual aldehyde or other solvent is distilled off.

The acidic catalysts to be used are those which are employed in making phenolic resins of the novolak type, for example, strong acids and compounds which generate strong acids on heating. There may be mentioned, by way of example, hydrogen chloride, sulphuric acid, phosphoric acid, zinc chloride, aluminium chloride and p-toluene-sulphonyl chloride.

The amount of the catalyst to be used depends to some extent on its nature. Amounts of the order of 0.01% to 1% of the weight of the methylol phenol usually suffice. In the case of phosphoric acid, which is the preferred catalyst, we use a weight equal to 0.1% of the weight of the methylol phenol.

In the preferred method of carrying out the invention the methylol phenol, acid catalyst and toluene are mixed at room temperature and the aldehyde is then added. Usually there is an immediate rise of temperature, presumably due to interaction of the aldehyde with the methylol phenol. The mixture is allowed to stand until this reaction has subsided and then it is gently distilled. The temperature rises progressively throughout the distillation as the proportion of water in the distillate falls. As long as water is evolved the distillate is condensed, the water rejected and the aldehyde and toluene returned to the reaction vessel. When no more water is evolved, the excess of aldehyde and the toluene are distilled off and the residual resin is further heated at a higher temperature to harden it.

Resins made by the process of this invention can be used for making all types of oil-varnishes, ranging from very short oil systems made with tung oil to long oil systems based on tung oil-linseed oil mixtures containing a high proportion of linseed oil. The blending with the oil is carried out in the customary manner. There is little or no frothing and the resin-oil system bodies sufficiently slowly that the process is readily controlled and there is very little risk of premature gelation.

Conventional driers, for example, linoleates or naphthenates of cobalt or lead may be used in known manner in the varnish formulations in quantity depending upon the purpose for which the varnish is intended and pigmented paints or enamels may be made from the varnishes by incorporating the usual pigments by the methods customary in the art.

The invention is illustrated but not limited by the following examples, in which the parts are by weight.

Example 1

The starting material for this example, namely p-tertiary butyl phenol dialcohol, is made as follows.

800 parts of p-tertiary butyl phenol, 950 parts of an aqueous 37% formaldehyde solution, 700 parts of an aqueous 32% caustic soda solution and 1000 parts of water are mixed and the mixture is stirred at room temperature for 24 hours. It is then acidified by the gradual addition of 700 parts of concentrated hydrochloric acid, the temperature being kept below 30° C. A heavy oil separates out and is run off and washed with 1000 parts of warm water (50° C.). There is thus obtained 1187 parts of a crude preparation of p-tertiary butyl phenol dialcohol, containing about 16% of water, a small proportion of sodium chloride and a trace of free acid.

152 parts of this crude dialcohol are mixed with 150 parts of n-butyraldehyde and 0.15 part of syrupy phosphoric acid (sp. gr. 1.75). The temperature rises spontaneously to 40° C. The mixture is allowed to stand until heat is no longer evolved and is then heated until water and residual aldehyde distil off. The vapours are condensed, the water separated off and the aldehyde returned to the reaction vessel. The temperature gradually rises during this process and when no further water comes off, the whole of the residual aldehyde is distilled off and the residue is heated at 150°–160° C. for 4¼ hours. At this point the resin is still soft and since a measurement of the amount of aldehyde distilled off shows that very little of that initially combined with the phenol dialcohol has been eliminated, it is heated to 180°–190° C. for a further ¾ hour. More aldehyde is eliminated and a clear hard brittle resin is formed.

This resin can be made into a 10 gallon tung oil varnish by cooking for 2½ minutes at 240° C. No frothing occurs and the varnish so made dries rapidly to give a pale hard film with good resistance to water, acids and alkalies.

Example 2

153 parts of crude p-tertiary butyl phenol dialcohol, made as described in Example 1, 24 parts of n-butyraldehyde, 100 parts of toluene and 0.15 part of syrupy phosphoric acid (sp. gr. 1.75) are mixed and the mixture is gently heated until distillation begins. Water, toluene and some aldehyde distil off. The vapours are condensed, the water separated off and rejected and the aldehyde and toluene returned to the reaction vessel. When no more water comes over, the mixture is cooled and filtered. The toluene and residual aldehyde are distilled off and the residue is heated up to 180° C. and held there for ¾ hour. During this heating some of the initially combined aldehyde is eliminated and there is finally obtained a hard brittle resin.

This resin can be made into a 10 gallon tung oil varnish by cooking for 2 minutes at 240° C. No frothing occurs and the varnish so made dries rapidly to give a pale film with good resistance to water, acids and alkalies.

Example 3

100 parts of the crude dialcohol prepared as described in Example 1, 29 parts of iso-butyraldehyde, 75 parts of toluene and 0.1 part of syrupy phosphoric acid (sp. gr. 1.75) are mixed and distilled in the manner described in Example 2.

When all the water has been removed, the mixture is cooled and filtered and the toluene and aldehyde are then distilled off. The residue is heated up to 180° C. and held there for ½ hour. During this period some initially combined aldehyde is eliminated. There is finally obtained a hard resin.

In making this resin into a 10 gallon tung oil varnish, no frothing occurs and a cooking for 1½ minutes at 240° C. is needed.

The varnish so made is pale in colour and dries rapidly giving a film which has good resistance to water, acids and alkalies.

Example 4

157 parts of crude dialcohol prepared as described in Example 1, 150 parts of heptaldehyde and 0.15 part of syrupy phosphoric acid (sp. gr. 1.75) are mixed, whereupon heat is evolved and the temperature rises to 38° C. The mixture is allowed to stand until it is cool. Water is then distilled out in the way described in Example 1. When all the water has been evolved, the mixture is cooled and filtered. The residual heptaldehyde is then distilled off and the residue is heated up to 180° C. at 30 mm. pressure, and held there for ½ hour. During this hardening process a further quantity of aldehyde is eliminated. There is finally obtained a semi-solid resin.

In making this resin into a 10 gallon tung oil varnish, 8 minutes' heating at 240° C. is needed. There is no frothing, and the varnish so made is pale in colour and dries well, giving a film with good resistance to water, acids and alkalies.

Example 5

167 parts of crude dialcohol prepared as described in Example 1, 150 parts of 2-ethyl-hexenal and 0.15 part of syrupy phosphoric acid (sp. gr. 1.75) are mixed. Very little heat is generated. The mixture is then heated and water is distilled off in the way described in Example 1. When all the water has been evolved the mixture is filtered. The filtrate is then gradually heated under 30 mm. pressure until the temperature reaches 160° C. During this heating, the excess of aldehyde is distilled off, some aldehyde initially combined is eliminated and the hardening of the resin takes place. The resin so obtained is hard and brittle and has M. P. 76° C. (Durrans' method).

In making this resin into a 10 gallon tung oil varnish, 2 minutes' heating at 240° C. is needed. There is no frothing and the varnish obtained dries rapidly to give a pale coloured film with good resistance to water, acids and alkalies.

Example 6

150 parts of p-tertiary butyl phenol, 164 parts of an aqueous 37% formaldehyde solution and 0.5 part of calcium hydroxide are mixed and the mixture is stirred and heated for 4 hours so that it refluxes gently. 150 parts of hot water are then added and the mixture is stirred for 5 minutes and then allowed to stand. The upper aqueous layer is decanted off and to the oily resole remaining there is added a mixture of 50 parts of n-butyraldehyde, 100 parts of toluene and 0.8 part of syrupy phosphoric acid (sp. gr. 1.75). At this point the reaction mixture has a pH of about 3. It is then heated in the manner described in Example 2, until all the water has been distilled out. The residue so obtained is difficult to filter because of the calcium phosphate which it contains. 100 parts of toluene and 3 parts of fuller's earth are stirred in and the mixture is then filtered. The filtrate is heated to distil off the toluene and excess of aldehyde and the residue is then heated to 180° C. and held there for ½ hour. During this heating some aldehyde initially combined in the resin is eliminated. There is finally obtained a hard brittle resin of M. P. 100° C. (Durrans' method).

This resin can be cooked into tung oil with no frothing. In preparing a 10 gallon tung oil varnish, 5 minutes' cooking at 240° C. is needed. The varnish so obtained dries rapidly to give a pale hard film having excellent resistance to water, acids and alkalies.

*Example 7*

108 parts of p-cresol, 164 parts of an aqueous 37% formaldehyde solution and 0.5 part of calcium hydroxide are stirred and heated to gentle reflux for 3 hours. 150 parts of hot water are added and the mixture is stirred for 5 minutes and then allowed to settle. The upper aqueous layer is then decanted off and to the oily resole remaining there are added 50 parts of n-butyraldehyde, 100 parts of toluene and 0.8 part of syrupy phosphoric acid (sp. gr. 1.75). At this point the reaction mixture has a pH of about 3. The mixture is heated as described in Example 6 until no more water distils out. 2 parts of fuller's earth are then added and the mixture is filtered. The filtrate is then gradually heated up to 180° C. and held there for 15 minutes. During this heating, the toluene and excess of aldehyde are first distilled off and then hardening of the resin proceeds, with elimination of aldehyde which was initially combined. There is finally obtained a hard brittle resin.

This resin can be cooked into tung oil with little frothing. In preparing a 10 gallon tung oil varnish one minute's heating at 240° C. is needed. The varnish so obtained gives a pale hard film having very good resistance to water, acids and alkalies.

Whereas the above examples illustrate several specific ways of carrying the invention into practice, it will be clear to one skilled in the art that many other embodiments of the invention can be devised without departing from the spirit and scope thereof, and accordingly it is to be understood that the invention is not limited to the embodiments described above, but only as defined in the following claims.

We claim:

1. Process for the manufacture of improved phenolic varnish resins which comprises heating a di-o-methylol derivative of a p-alkyl-substituted monohydric phenol with an aliphatic aldehyde of 3 to 8 carbon atoms at a temperature of about 70°–160° C., in the presence of an acidic catalyst until no more water is evolved and then heating the residue to a temperature of about 160°–190° C. to harden the resin.

2. Process for the manufacture of improved phenolic varnish resins which comprises heating an aliphatic aldehyde of 3 to 8 carbon atoms with a member of the class consisting of o-dimethylol p-tertiary butyl phenol and resoles obtained therefrom by further heating, at a temperature in the range 70°–160° C. in the presence of an acidic catalyst until no more water is evolved and then heating the residue to a temperature in the range 160°–190° C. to harden the resin.

3. An improved phenolic varnish resin prepared according to the process of claim 1.

4. An improved phenolic varnish resin prepared according to the process of claim 2.

5. The process of preparing improved phenolic varnish resins which comprises heating an o-dimethylol derivative of a p-alkyl substituted monohydric phenol with an aliphatic aldehyde of from 3 to 8 carbon atoms in the presence of an acidic catalyst until the reaction proceeds to the point where the reaction mixture after uncombined aldehyde and volatile liquid are removed is a viscous liquid.

6. The product prepared according to claim 5.

7. The process of claim 1 in which the said phenol and aldehyde are heated in the presence of an inert organic solvent.

8. The process of claim 2 in which the said aldehyde and phenol are heated in the presence of an inert solvent.

WILLIAM CHARLTON.
JACK BLATCHLEY HARRISON.
ROY BASIL WATERS.